United States Patent
Rajamani et al.

(10) Patent No.: US 12,354,020 B2
(45) Date of Patent: Jul. 8, 2025

(54) GENERATING AND UTILIZING PERFORATIONS TO IMPROVE DECISION MAKING

(71) Applicant: INTERNATIONAL BUSINESS MACHINES CORPORATION, Armonk, NY (US)

(72) Inventors: Magesh Rajamani, Chennai (IN); Gandhi Sivakuma, Bentleigh (AU); Ramanakumar Natarajan, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 450 days.

(21) Appl. No.: 17/930,860

(22) Filed: Sep. 9, 2022

(65) Prior Publication Data
US 2024/0086728 A1    Mar. 14, 2024

(51) Int. Cl.
*G06N 5/022*    (2023.01)
(52) U.S. Cl.
CPC .................. *G06N 5/022* (2013.01)
(58) Field of Classification Search
CPC ..................................................... G06N 5/022
See application file for complete search history.

(56) References Cited

U.S. PATENT DOCUMENTS

| | | | | |
|---|---|---|---|---|
| 8,204,809 B1 * | 6/2012 | Wise | ...................... | G06Q 40/06 705/36 R |
| 11,983,094 B2 * | 5/2024 | Downie | .............. | G06F 11/3698 |
| 2016/0319642 A1 * | 11/2016 | Ahmed | ...................... | E21B 7/04 |
| 2017/0138013 A1 * | 5/2017 | Woolbright | ......... | E02D 29/0225 |
| 2017/0152731 A1 * | 6/2017 | Andersen | .............. | E21B 43/103 |

(Continued)

OTHER PUBLICATIONS

Alkan, et al., "Frote: Feedback Rule-Driven Oversampling for Editing Models", Proceedings of the 5th MLSys Conference, 2022, arXiv:2201.01070v2 [cs.LG], Jan. 6, 2022, 23 pgs., <https://proceedings.mlsys.org/paper/2022/file/63dc7ed1010d3c3b8269faf0ba7491d4-Paper.pdf>.

(Continued)

*Primary Examiner* — David E Choi
(74) *Attorney, Agent, or Firm* — Steven M. Bouknight

(57) ABSTRACT

An embodiment for managing machine learning models to generate and utilize perforations within machine learning models to improve their ability to consider and learn from exception decisions. The embodiment may detect an exception decision in a base model. The embodiment may automatically determine data considered in making the exception decision and identify and store in a database known features from the gathered data. The embodiment may automatically identify and store in the database remaining additional features considered, and generate and store perforations corresponding to the remaining additional features considered. The embodiment may, in response to detecting subsequent decisions involving shared additional features contained in the generated perforations, automatically validate feature boundaries within the generated perforations from a set of data sources. The embodiment may automatically calculate scores for the subsequent decisions using both the base model and corresponding perforation and output decision recommendations for the subsequent decisions.

20 Claims, 3 Drawing Sheets

(56) References Cited

U.S. PATENT DOCUMENTS

| | | | |
|---|---|---|---|
| 2019/0012249 A1 | 1/2019 | Mercuri | |
| 2019/0113927 A1* | 4/2019 | Englard | G06F 16/285 |
| 2020/0167653 A1 | 5/2020 | Manjunath | |
| 2020/0340353 A1* | 10/2020 | Ding | E21B 47/022 |
| 2021/0140671 A1* | 5/2021 | Francis | F24F 11/64 |
| 2021/0149788 A1* | 5/2021 | Downie | G06F 11/3604 |
| 2022/0092421 A1 | 3/2022 | Ananthanarayanan | |
| 2024/0086728 A1* | 3/2024 | Rajamani | G06N 20/00 |

OTHER PUBLICATIONS

Bansal, et al., "Beyond Accuracy: The Role of Mental Models in Human-AI Team Performance", Association for the Advancement of Artificial Intelligence, 2019, 10 pgs., <http://erichorvitz.com/gbansal-hcomp19.pdf>.

Kumar, et al., "Enhanced Decision Tree Algorithm for Discovery of Exceptions", ResearchGate, Jan. 2020, 13 pgs., <https://www.researchgate.net/publication/339342872_Enhanced_Decision_Tree_Algorithm_for_Discovery_of_Exceptions>.

Yang, "Boundary thickness and robustness in learning models", 34th Conference on Neural Information Processing Systems (NeurIPS), 2020, arXiv:2007.05086v2 [cs.LG], Jan. 12, 2021, 28 pgs., <https://proceedings.neurips.cc/paper/2020/file/44e76e99b5e194377e955b13fb12f630-Paper.pdf>.

\* cited by examiner

GENERATING AND UTILIZING PERFORATIONS TO IMPROVE DECISION MAKING

BACKGROUND

The present application relates generally to managing machine learning models, and more particularly, to generating and utilizing perforations within machine learning models to improve the ability of the models to consider and learn from exception decisions.

Artificial intelligence (AI) based machine learning models have been integrated into many businesses spanning various industries as an increasing number of use cases have been developed. One common use case for AI-based machine learning models is assisting users in making decisions (label based or value based) by applying probabilistic outcome-based intelligence. While machine learning models can now consider various criteria and continuously learn over time, there are still instances in which humans may decide to make an exception or anomaly type decision that would differ from the decision a machine learning model would have made.

SUMMARY

According to one embodiment, a method, computer system, and computer program product for generating and utilizing perforations within machine learning models to improve the ability of the models to consider and learn from exception decisions is provided. The embodiment may include detecting an exception decision in a base model. The embodiment may also include automatically determining data considered in making the exception decision, and identifying and storing in a database known features from the gathered data. The embodiment may further include automatically identifying and storing in the database remaining additional features considered, and generating and storing perforations corresponding to the remaining additional features considered. The embodiment may also include automatically generating perforation models for each of the generated perforations. The embodiment may further include in response to detecting subsequent decisions involving shared additional features contained in the generated perforations, automatically validating feature boundaries within the generated perforations from a set of data sources. The embodiment may also include automatically identifying roles for deviation and calculating scores for the subsequent decisions using both the base model and corresponding perforation. The embodiment may further include outputting decision recommendations for the subsequent decisions.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
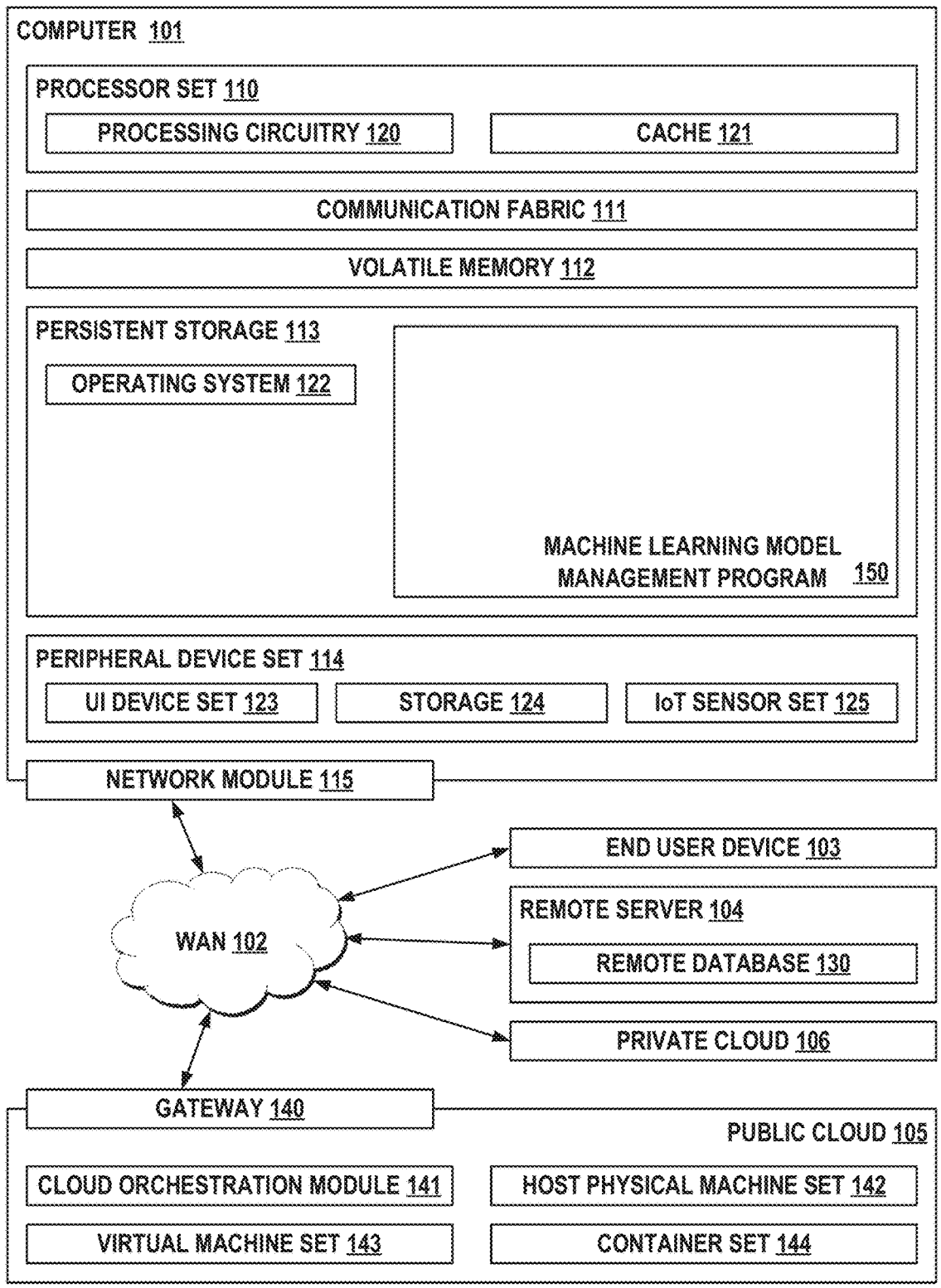
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to managing machine learning models, and more particularly, to generating and utilizing perforations within machine learning models to improve the ability of the models to consider and learn from exception decisions. The following described exemplary embodiments provide a system, method, and program product to, among other things, detect an exception decision in a base model, automatically determine data considered in making the exception decision, automatically identify and store in a database known features from the gathered data, automatically identify and store in the database remaining additional features considered, and generate and store perforations corresponding to the remaining additional features considered. The provided exemplary embodiments may then, in response to detecting subsequent decisions involving shared additional features contained in the generated perforations, automatically validate feature boundaries within the generated perforations from a set of data sources, automatically identify roles for deviation and calculate scores for the subsequent decisions using both the base model and corresponding perforation, and output decision recommendations for the subsequent decisions. Therefore, the presently described embodiments have the capacity to improve managing of machine learning models by generating and utilizing perforations within machine learning models to improve the ability of the models to consider and learn from exception decisions without weakening the accuracy or performance of the model.

As previously described, Artificial intelligence (AI) based machine learning models have been integrated into many businesses spanning various industries as an increasing number of use cases have been developed. One common use case for AI-based machine learning models is assisting users in making decisions (label based or value based) by applying probabilistic outcome-based intelligence. While machine learning models can now consider various criteria and continuously learn over time, there are still instances in which humans may decide to make an exception or anomaly type decision that would differ from the decision a machine learning model would have made. For example, a bank manager may override a decision made by a machine learning model regarding the denial of a loan request for a loyal customer who has been a customer of the bank for over 20 years. Customer loyalty may not have been a feature that was even considered by the machine learning model making the initial decision. Typical machine learning models may try to expand or contract the preexisting model boundaries based on this feedback. However, many exceptions deep inside the boundary may often get ignored even in view of the additional feedback. For subsequent decisions following an exception decision, many machine learning models may weigh exception factors either too heavily, or not enough. Both approaches can negatively impact the performance of the base model in the presence of exception decisions. Accordingly, a method for generating and utilizing perforations within machine learning models to improve the ability of the models to consider and learn from exception decisions would be advantageous.

According to at least one embodiment of a computer system capable of employing methods in accordance with the present invention to generate and utilize perforations within machine learning models to improve the ability of the models to consider and learn from exception decisions, the method, system, computer program product may detect an exception decision in a base model. The method, system, computer program product may automatically determine data considered in making the exception decision, and identifying and storing in a database known features from the gathered data. According to one embodiment, the method, system, computer program product may then automatically identify and store in the database remaining additional features considered, and generate and store perforations corresponding to the remaining additional features considered. The method, system, computer program product may then, in response to detecting subsequent decisions involving shared additional features contained in the generated perforations, automatically validate feature boundaries within the generated perforations from a set of data sources. Then, the method, system, computer program product may automatically identify roles for deviation and calculate scores for the subsequent decisions using both the base model and corresponding perforation. The method, system, computer program product may then output decision recommendations for the subsequent decisions. In turn, the method, system, computer program product has provided improved methods for generating and utilizing perforations within machine learning models to improve the ability of the models to consider and learn from exception decisions. Rather than attempting to update the base model in view of exception decisions, presently described embodiments build additional and separate perforation boundaries by identifying features and values which contribute to the exception decisions, allowing for transactions to be run against both the base model and the generated preformation models to increase model accuracy in the presence of exception decisions.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as machine learning model management program/code 150. In addition to machine learning model management code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and machine learning model management code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in machine learning model management code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in machine learning model management program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the machine learning model management program 150 may be a program capable of detecting an exception decision in a base model. Machine learning model management program 150 may then automatically determine data considered in making the exception decision. Next, machine learning model management program 150 may automatically identify and store in a database known additional features from the gathered data considered in making the exception decision. Machine learning model management program 150 may then automatically identify and store in the database remaining additional features considered, and generate and store perforations corresponding to the remaining features considered. Next, machine learning model management program 150 may, in response to detecting subsequent decisions involving shared additional features contained in the generated perforations, automatically validate feature boundaries within the generated perforations from a set of data sources. Then machine learning model management program 150 may automatically identify roles for deviation and calculate scores for the subsequent decisions using both the base model and corresponding perforation. Finally, machine learning model management program 150 may outputting decision recommendations for the subsequent decisions. In turn, machine learning model management program 150 has provided improved methods for generating and utilizing perforations within machine learning models to improve the ability of the models to consider and learn from exception decisions. Rather than attempting to update the base model in view of exception decisions, presently described embodiments build additional and separate perforation boundaries by identifying features and values which contribute to the exception decisions, allowing for transactions to be run against both the base model and the generated preformation models to increase model accuracy in the presence of exception decisions.

Figure 2:
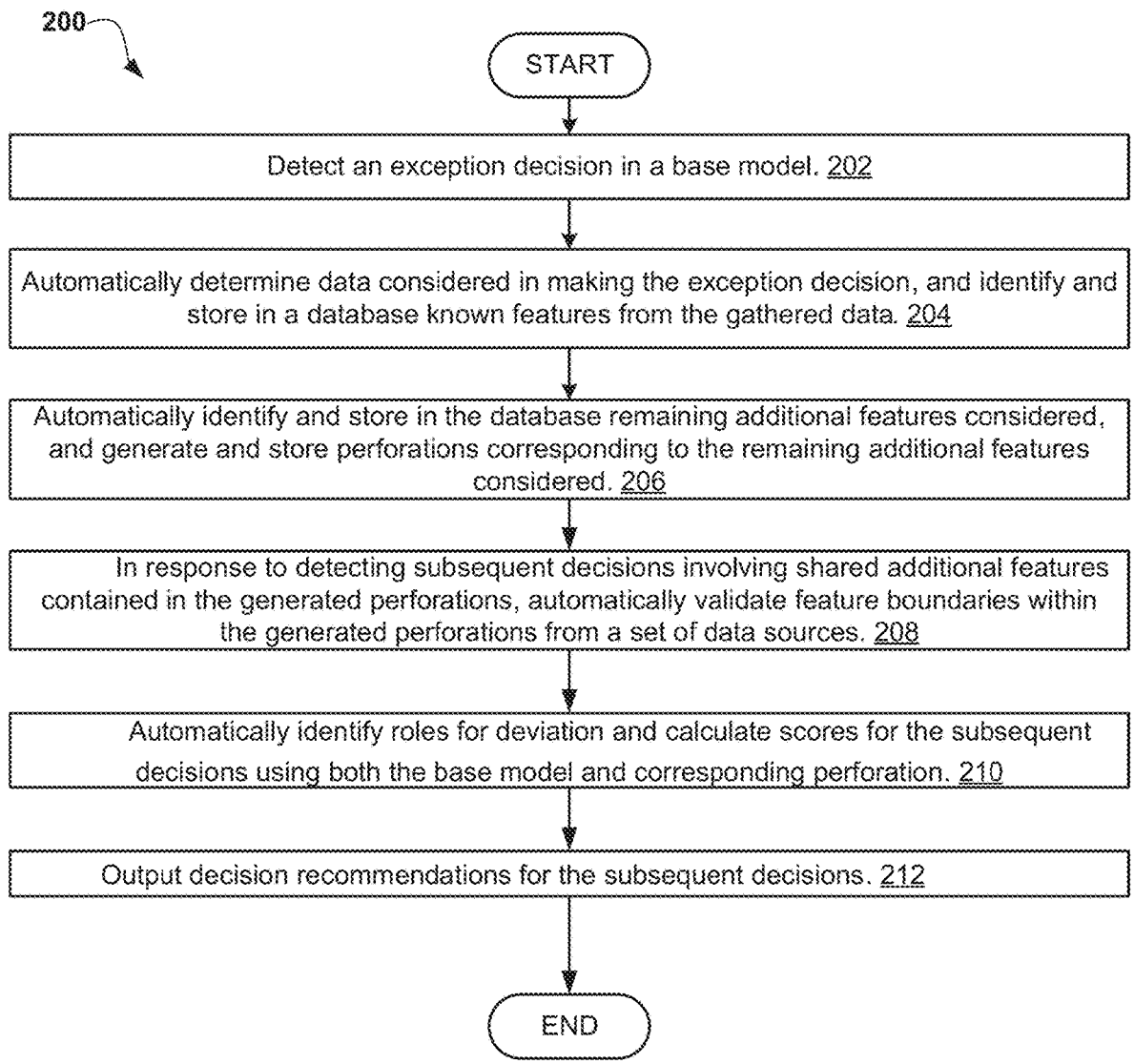
FIG. 2 illustrates an operational flowchart for a process of generating and utilizing perforations within machine learning models to improve the ability of the models to consider and learn from exception decisions according to at least one embodiment.

Referring now to FIG. 2, an operational flowchart 200 for generating and utilizing perforations within machine learning models to improve the ability of the models to consider and learn from exception decisions according to at least one embodiment is provided. At 202, machine learning model management program 150 detects an exception decision in a base model. In the context of this disclosure, a base model is any machine learning model that is being managed by machine learning model management program 150. In the context of this disclosure, machine learning broadly describes a function of a system that learns from data. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

In the context of this disclosure an exception decision may be any decision that is anomalous in nature, or that otherwise overrides a decision made by the base model. Exception decisions may be the result of a user manually overriding a decision made by the base model. For example, if machine learning model management program 150 is managing an exemplary machine learning model referred to as 'Model A' operating within a financial domain making decisions regarding whether a loan request should be approved or denied, an exemplary 'Customer A' may submit a request for a loan. Model A may then consider a variety of factors to ultimately output a decision to deny the loan request of Customer A. A bank manager may subsequently override the decision of the base model and approve the loan request, creating an exception decision. Accordingly, at 202, machine learning model management program 150 would detect this act of overriding the base model as an exception decision.

At 204, machine learning model management program 150 determines what data was considered in making the exception decision, and identifies and stores in a database known features from the gathered data. In this step machine learning model management program 150 captures a data footprint for the exception decision that includes any data related to known model features, the date of the transaction, as well as the name and role of the person who overrode the base model's decision. Using the example above, machine learning model management program 150 may determine data about the user who overrode the decision, including their role as manager. Machine learning model management program 150 would also determine data related to known model features related to loan requests. In this example, machine learning model management program 150 may typically consider features such as customer credit score, customer income, and customer assets. This information may ultimately be used by machine learning model management program 150 in later steps that will be described in greater detail below to bolster the base model's ability to output more accurate decisions.

At 206, machine learning model management program 150 automatically identifies and stores in the database remaining additional features considered, and generates and store perforations corresponding to the remaining additional features considered. Using the same example above, the bank manager may have overridden Model A's decision to deny Customer A the loan because Customer A has been a loyal user of the bank for over 20 years. This override thus produced an anomalous exception decision based upon a feature or factor that Model A was not trained to consider. Accordingly, machine learning model management program 150 will identify this feature and value as an additional feature not considered by Model A. Machine learning model management program 150 may then store this additional feature, say 'Number of years with bank', into the database and generate and store a perforation corresponding to the feature. In the context of this disclosure, a perforation is an additional boundary built within the boundary of an existing base model that is associated with a specific additional feature that was not originally considered by the base model that contributes to exception decisions. In embodiments, the boundary of a given perforation may also be dependent upon certain known features related to the additional feature. For example, a generated perforation for 'Number of years with bank' may also be dependent on a known feature such as 'Customer Age', as the anomaly associated with the unknown additional feature of 'Number of years with bank' may only apply to a subset of customers who also fall into a certain value for the known feature of 'Customer Age'. Accordingly, the generated perforation and associated boundary may be determined based upon both additional features as well as known features. In embodiments, machine learning model management program 150 may utilize suitable known natural language processing tools to identify and extract additional features not considered by the base model from comments provided to the system when decisions are overridden. The generated perforations provide an alternate method for exception decisions and features that lead to exception decisions to be considered in subsequent decisions while avoiding the typical risk to the base model's accuracy posed by attempting to account for such anomalies or outliers. Machine learning model management program 150 may thus continuously monitor and gather data associated with exception decisions and corresponding generated perforations. The role of the generated perforations in improving the model's accuracy will be discussed in more detail below.

At 208, machine learning model management program 150, in response to detecting subsequent decisions involving shared additional features contained in the generated perforations, automatically validates feature boundaries within the generated perforations from a set of data sources. For example, if machine learning model management program 150 detects a subsequent decision regarding a request for a loan made by a 'Customer B' who has been with the bank for 25 years, it will detect this shared additional feature, 'Number of years with bank' in the previously generated perforation. Machine learning model management program 150 may then automatically validate feature boundaries using relevant data sources. For example, feature boundaries may be formed using values of various features which were used in overriding decisions and hence used to form a perforation. As more exception (anomalous) decisions are provided, the boundary of generated perforations may expand, or new perforations may form in a different area of the original model boundary. For example, a perforation boundary in an original exemplary model may be related to the age of the user between 30 and 45 with an additional validated feature boundary related to the number of years a customer has been with a given bank being greater than 20 years.

At 210, machine learning model management program 150 automatically identifies roles for deviation and calculates scores for the subsequent decisions using both the base model and corresponding perforation. In the context of this disclosure, 'role' references the role of a given person who overrides a given decision. Machine learning model management program 150 may consider current user role or a role higher in organization hierarchy when processing subsequent decisions to ensure that only overrides by comparable users or higher authority are provided as recommendations. Additionally, at this step, machine learning model management program 150 automatically calculates scores for the subsequent decisions using both the base model and corresponding perforation. For example, using the same example discussed above involving Customer B's request for a loan, machine learning model management program 150 ensures that the transaction is run through both the base model, as well as the previously generated perforation. Because the exception decisions and features associated with the exception decisions are somewhat isolated in the already generated perforations, the perforation constructively acts as a secondary model through which to consider the corresponding features. This constructive perforation model insulates the base model from the exception decisions anomalous and outlier-like characteristics, avoiding the need for the base model to expand or contract in response to exception decisions deep inside the base model's boundaries, minimizing or even eliminating the risk that the boundary would be ignored or that the model would not improve based on the feedback associated with the exception decision. Accordingly, machine learning model management program 150 identifies roles for deviation and calculates scores for the decision being made that takes into account both the base model and the constructive perforation model. As discussed above, machine learning model management program 150 also gathers data relating to transaction dates and overriding user roles of previously made exception decisions to further inform the considerations of the base model and the constructive perforation model. Machine learning model management program 150 may then calculate a score for the subsequent decision using both models. This score may be any useful numerical value or metric for measuring confidence in the model's decision. In this example, the score may be a numerical value (for example a number between 0 and 1.0) that may correspond to a certain decision when the value is above or below a predetermined threshold. For example, if the combined score for the decision regarding Customer B's loan request is a 0.90, reflecting the large number of years Customer B has been with the bank, and machine learning model management program 150 is configured to suggest an exception decision be overridden for any decision with a score of greater than 0.80, then machine learning model management program 150 may output a recommendation at step 212 to override the base model's decision. In embodiments, the score may be calculated from a first component associated with the base model, and a second component associated with a corresponding perforation, with both the first component and second components having a desired predetermined weight assigned thereto. The output recommendation may be presented on any suitable user interface as may be desired by a user employing a machine learning model management program as described herein.

Figure 3:
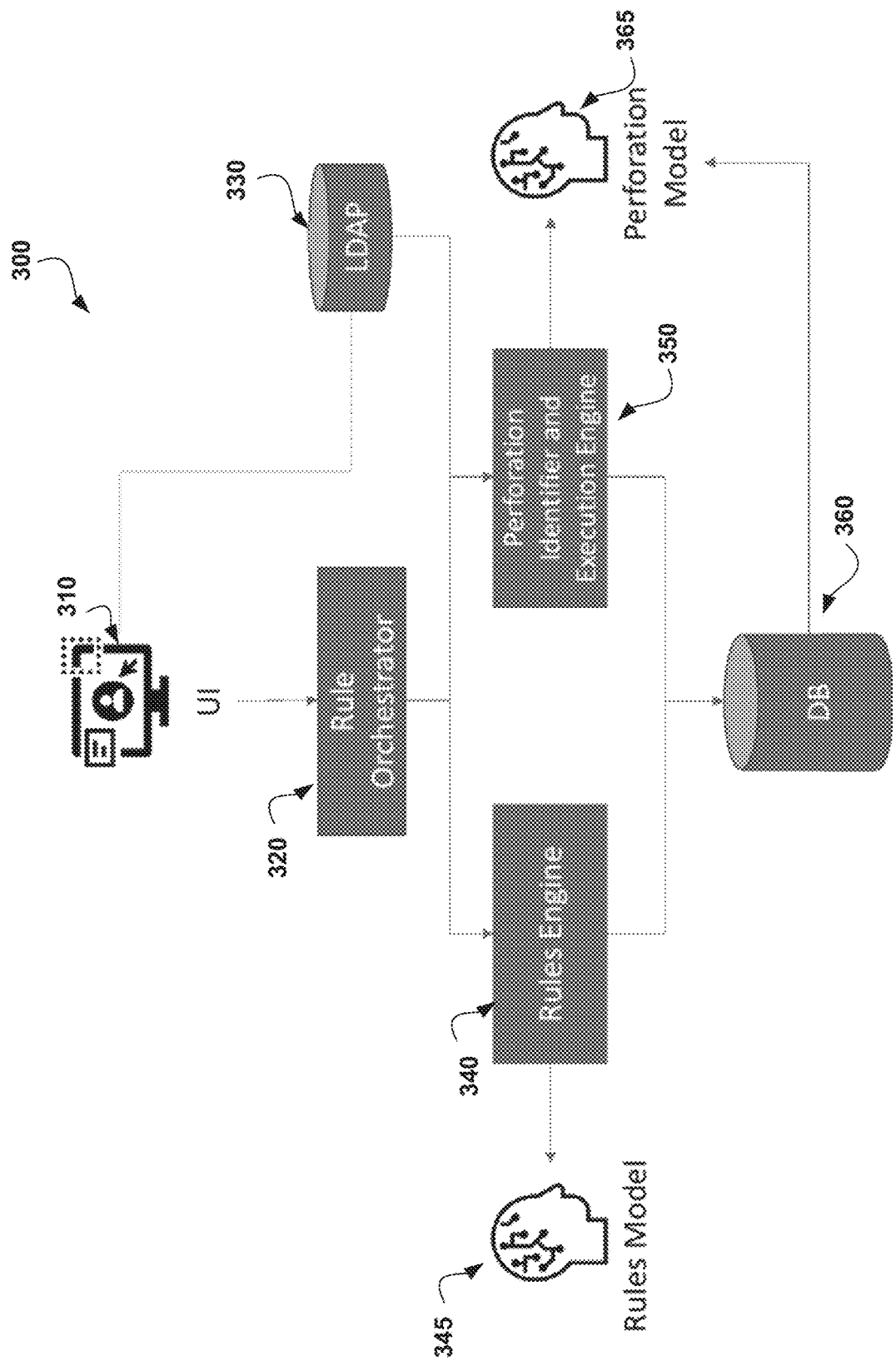
FIG. 3 illustrates a diagram showing illustrative components and architecture that may be used to employ a process of generating and utilizing perforations within machine learning models to improve the ability of the models to consider and learn from exception decisions according to at least one embodiment.

FIG. 3 depicts a diagram showing illustrative components and architecture in an illustrative system 300 that may be used to employ the process of generating and utilizing perforations within machine learning models to improve the ability of the models to consider and learn from exception decisions described above. System 300 may include a user interface (UI) 310, a rule orchestrator 320, a Lightweight Directory Access Protocol (LDAP) 330, a rules engine 340 that supports a rules model 345, a perforation identifier and execution engine 350, and database (DB) 360 that support a constructive perforation model 365. This depiction of components is merely illustrative and non-exhaustive. Additional tools or components may be added to a given system as may be desirable to achieve various functions and features described in detail above.

It may be appreciated in view of the above discussion that machine learning model management program 150 uses the generation and utilization of perforations to provide for an improved method for managing machine learning models in the presence of exception decisions. Many existing decision-making algorithms such as KNN or Boosting algorithms attempt to fit exception decision feedback into existing models. If the feedback received includes anomalies, this will skew the model and result in poorer performance of the model. However, machine learning model management program 150 uses perforations to handle anomalies as shared feedback based on business needs. It achieves this by not adding the anomalous data to the base model, but by creating separate perforations for each anomalous area in the n-dimension and comparing the decision from the original model against the perforation. Thus, models managed by machine learning model management program 150 may use the constructive perforation models to identify and update recommendations without affecting the base model.

Additionally, in many known algorithms there is no difference between the regular training set and anomalous feedback. Hence these algorithms cannot differentiate a regular recommendation from an override recommendation based on historical feedback. However, models managed by machine learning model management program 150 can use the constructive perforation models to maintain the perforations caused by feedback separately and can provide evidence-based recommendation containing both recommendation from the base model and suggested override based on previous feedbacks which caused generation of perforations.

It may be appreciated that FIGS. 2-3 provide only illustrations of an exemplary implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of generating and utilizing perforations within machine learning models, the method comprising:
   detecting an exception decision in a base model;
   automatically determining data considered in making the exception decision, and identifying and storing in a database known features from the determined data;
   automatically identifying and storing in the database remaining additional features considered, and generating and storing perforations corresponding to the remaining additional features considered;
   in response to detecting subsequent decisions involving shared additional features contained in the generated perforations, automatically validating feature boundaries within the generated perforations from a set of data sources;
   automatically identifying roles for deviation and calculating scores for the subsequent decisions using both the base model and corresponding perforation; and
   outputting decision recommendations for the subsequent decisions.

2. The computer-based method of claim 1, wherein automatically identifying and storing in the database the remaining additional features considered further comprises:
   automatically utilizing natural language processing tools to identify the remaining additional features.

3. The computer-based method of claim 1, wherein automatically determining the data considered in making the exception decision, and identifying and storing in the database known features from the determined data further comprises:
   identifying and storing a name and role of a user responsible for the exception decision.

4. The computer-based method of claim 1, wherein outputting the decision recommendations for the subsequent decisions further comprises:
   sending the decision recommendation to a user interface to output to a user.

5. The computer-based method of claim 1, further comprising:
   continuously monitoring and storing data corresponding to exception decisions and associated perforations.

6. The computer-based method of claim 1, wherein automatically identifying and storing in the database the remaining additional features considered, and generating and storing the perforations corresponding to the remaining additional features considered further comprises:
   automatically generating constructive perforation models using data from the database and a perforation identifier and execution engine.

7. The computer-based method of claim 1, wherein automatically identifying the roles for the deviation and calculating the scores for the subsequent decisions using both the base model and the corresponding perforation further comprises:
   calculating the score using a first component associated with the base model, the first component being assigned a first weight, and a second component associated with the corresponding perforation, the second component being assigned a second weight.

8. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
   detecting an exception decision in a base model;
   automatically determining data considered in making the exception decision, and identifying and storing in a database known features from the determined data;
   automatically identifying and storing in the database remaining additional features considered, and generating and storing perforations corresponding to the remaining additional features considered;
   in response to detecting subsequent decisions involving shared additional features contained in the generated perforations, automatically validating feature boundaries within the generated perforations from a set of data sources;
   automatically identifying roles for deviation and calculating scores for the subsequent decisions using both the base model and corresponding perforation; and
   outputting decision recommendations for the subsequent decisions.

9. The computer system of claim 8, wherein automatically identifying and storing in the database the remaining additional features considered further comprises:
   automatically utilizing natural language processing tools to identify the remaining additional features.

10. The computer system of claim 8, wherein automatically determining the data considered in making the exception decision, and identifying and storing in the database known features from the determined data further comprises:
    identifying and storing a name and role of a user responsible for the exception decision.

11. The computer system of claim 8, wherein outputting the decision recommendations for the subsequent decisions further comprises:
    sending the decision recommendation to a user interface to output to a user.

12. The computer system of claim 8, further comprising:
    continuously monitoring and storing data corresponding to exception decisions and associated perforations.

13. The computer system of claim 8, wherein automatically identifying and storing in the database the remaining additional features considered, and generating and storing the perforations corresponding to the remaining additional features considered further comprises:
    automatically generating constructive perforation models using data from the database and a perforation identifier and execution engine.

14. The computer system of claim 8, wherein automatically identifying the roles for the deviation and calculating the scores for the subsequent decisions using both the base model and the corresponding perforation further comprises:
calculating the score using a first component associated with the base model, the first component being assigned a first weight, and a second component associated with the corresponding perforation, the second component being assigned a second weight.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
detecting an exception decision in a base model;
automatically determining data considered in making the exception decision, and identifying and storing in a database known features from the determined data;
automatically identifying and storing in the database remaining additional features considered, and generating and storing perforations corresponding to the remaining additional features considered;
in response to detecting subsequent decisions involving shared additional features contained in the generated perforations, automatically validating feature boundaries within the generated perforations from a set of data sources;
automatically identifying roles for deviation and calculating scores for the subsequent decisions using both the base model and corresponding perforation; and
outputting decision recommendations for the subsequent decisions.

16. The computer program product of claim 15, wherein automatically identifying and storing in the database the remaining additional features considered further comprises:
automatically utilizing natural language processing tools to identify the remaining additional features.

17. The computer program product of claim 15, wherein automatically determining the data considered in making the exception decision, and identifying and storing in the database known features from the determined data further comprises:
identifying and storing a name and role of a user responsible for the exception decision.

18. The computer program product of claim 15, wherein outputting the decision recommendations for the subsequent decisions further comprises:
sending the decision recommendation to a user interface to output to a user.

19. The computer program product of claim 15, wherein automatically identifying and storing in the database the remaining additional features considered, and generating and storing the perforations corresponding to the remaining additional features considered further comprises:
automatically generating constructive perforation models using data from the database and a perforation identifier and execution engine.

20. The computer program product of claim 15, wherein automatically identifying the roles for the deviation and calculating the scores for the subsequent decisions using both the base model and the corresponding perforation further comprises:
calculating the score using a first component associated with the base model, the first component being assigned a first weight, and a second component associated with the corresponding perforation, the second component being assigned a second weight.

\* \* \* \* \*